US012802884B2

(12) United States Patent
Muramatsu

(10) Patent No.: US 12,802,884 B2
(45) Date of Patent: Nov. 17, 2026

(54) MULTILAYER CERAMIC CAPACITOR INCLUDING STRESS RELIEF FILM

(71) Applicant: Murata Manufacturing Co., Ltd., Nagaokakyo (JP)

(72) Inventor: Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 107 days.

(21) Appl. No.: 18/800,369

(22) Filed: Aug. 12, 2024

(65) Prior Publication Data

US 2024/0404755 A1 Dec. 5, 2024

Related U.S. Application Data

(63) Continuation of application No. PCT/JP2023/019376, filed on May 24, 2023.

(30) Foreign Application Priority Data

Sep. 20, 2022 (JP) ................................ 2022-149408

(51) Int. Cl.
*H01G 4/224* (2006.01)
*H01G 2/06* (2006.01)
(Continued)

(52) U.S. Cl.
CPC ............... *H01G 4/224* (2013.01); *H01G 2/06* (2013.01); *H01G 4/232* (2013.01); *H01G 4/30* (2013.01); *H01G 4/12* (2013.01)

(58) Field of Classification Search
CPC .......... H01G 4/224; H01G 4/232; H01G 2/06; H01G 4/30
See application file for complete search history.

(56) References Cited

U.S. PATENT DOCUMENTS

2013/0020913 A1 1/2013 Shirakawa et al.
2013/0038982 A1 2/2013 Lee et al.
(Continued)

FOREIGN PATENT DOCUMENTS

JP S63115206 U * 7/1988
JP 2013026392 A 2/2013
(Continued)

OTHER PUBLICATIONS

Translation JP S63115206U (Year: 1988).*
(Continued)

*Primary Examiner* — Eric W Thomas
(74) *Attorney, Agent, or Firm* — Keating & Bennett, LLP

(57) ABSTRACT

A multilayer ceramic capacitor includes a multilayer body including dielectric layers and internal electrode layers, external electrodes on at least a second main surface of the multilayer body, and a stress suppression film to suppress stress provided on the multilayer body and the external electrodes. The stress suppression film includes an insulating material and extends along a first main surface and two end surfaces, or along the first main surface and two side surfaces to cover the multilayer body and the external electrodes. Ends of the stress suppression film protrude with respect to outermost surfaces of the external electrodes on a side of the second main surface.

19 Claims, 12 Drawing Sheets

(51) Int. Cl.

| | |
|---|---|
| ***H01G 4/232*** | (2006.01) |
| ***H01G 4/30*** | (2006.01) |
| *H01G 4/12* | (2006.01) |

(56) References Cited

U.S. PATENT DOCUMENTS

| | | | | |
|---|---|---|---|---|
| 2015/0022945 | A1* | 1/2015 | Park | H01G 4/2325 156/89.18 |
| 2015/0103465 | A1* | 4/2015 | Kang | H01G 4/008 29/25.42 |
| 2016/0276104 | A1 | 9/2016 | Nishisaka et al. | |
| 2016/0284471 | A1* | 9/2016 | Mizuno | H01G 4/1227 |
| 2017/0154731 | A1 | 6/2017 | Tahara et al. | |
| 2017/0271081 | A1 | 9/2017 | Maki et al. | |
| 2017/0278634 | A1 | 9/2017 | Kato | |
| 2018/0019064 | A1* | 1/2018 | Han | H01G 4/40 |
| 2018/0174750 | A1 | 6/2018 | Yoon et al. | |
| 2020/0111614 | A1 | 4/2020 | Kim et al. | |
| 2020/0152382 | A1 | 5/2020 | Sakurai et al. | |
| 2021/0020374 | A1* | 1/2021 | Kim | H01G 4/30 |
| 2025/0391613 | A1* | 12/2025 | Nakamura | H01G 9/10 |

FOREIGN PATENT DOCUMENTS

| | | | | | |
|---|---|---|---|---|---|
| JP | 2013042110 | A | | 2/2013 | |
| JP | 2016111280 | A | * | 6/2016 | H01F 17/0013 |
| JP | 2016178219 | A | | 10/2016 | |
| JP | 2017103321 | A | | 6/2017 | |
| JP | 2017130582 | A | | 7/2017 | |
| KR | 20160113038 | A | | 9/2016 | |
| KR | 20170064457 | A | | 6/2017 | |
| KR | 20170113108 | A | | 10/2017 | |
| KR | 20180069507 | A | | 6/2018 | |

OTHER PUBLICATIONS

International Search Report in PCT/JP2023/019376, mailed Aug. 22, 2023, 2 pages.

Written Opinion in PCT/JP2023/019376, mailed Aug. 22, 2023, 3 pages.

Official Communication issued in corresponding European Patent Application No. 23867815.5, mailed on Jul. 30, 2026, 11 pages.

* cited by examiner

MULTILAYER CERAMIC CAPACITOR INCLUDING STRESS RELIEF FILM

CROSS REFERENCE TO RELATED APPLICATIONS

This application claims the benefit of priority to Japanese Patent Application No. 2022-149408 filed on Sep. 20, 2022 and is a Continuation Application of PCT Application No. PCT/JP2023/019376 filed on May 24, 2023. The entire contents of each application are hereby incorporated herein by reference.

BACKGROUND OF THE INVENTION

1. Field of the Invention

The present invention relates to multilayer ceramic capacitors.

2. Description of the Related Art

Multilayer ceramic capacitors known in the art include a multilayer body formed by stacking a plurality of dielectric layers including ceramic material and a plurality of internal electrode layers, and external electrodes on end surfaces or lateral surfaces of the multilayer body. In such multilayer ceramic capacitors, there is a demand for further downsizing and slimming down (refer to Japanese Unexamined Patent Application, Publication No. 2013-42110, for example).

SUMMARY OF THE INVENTION

When multilayer ceramic capacitors are slimmed down, the strength of the multilayer body decreases particularly in the ceramic layers, potentially damaging the multilayer ceramic capacitors due to the stress exerted by the mounters during mounting. For instance, cracks may occur in the ceramic layers of the multilayer body. If such cracks extend to the internal electrode layers, for example, moisture may infiltrate through the cracks, resulting in degradation of the insulation properties of the multilayer ceramic capacitor.

Example embodiments of the present invention provide multilayer ceramic capacitors each capable of decreasing or preventing a reduction in strength against external stress, even when slimmed down.

A multilayer ceramic capacitor according to an example embodiment of the present invention includes a multilayer body including a plurality of dielectric layers including a ceramic material, and a plurality of internal electrode layers, the multilayer body including a first main surface and a second main surface on opposite sides in a lamination direction, two lateral surfaces on opposite sides in a width direction intersecting with the lamination direction, and two end surfaces on opposite sides in a length direction intersecting with both the lamination direction and the width direction, a plurality of external electrodes provided on at least the second main surface of the multilayer body, and a stress relief film to mitigate stress provided on the multilayer body and the plurality of external electrodes. The stress relief film includes an insulating material. The stress relief film extends along the first main surface and the two end surfaces or extends along the first main surface and the two lateral surfaces, so as to cover the multilayer body and the plurality of external electrodes, and an end portion of the stress relief film protrudes beyond an outermost surface of the plurality of external electrodes, on the second main surface side.

Multilayer ceramic capacitors according to example embodiments of the present invention are capable of decreasing or preventing a reduction in strength against external stress, even when slimmed down.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
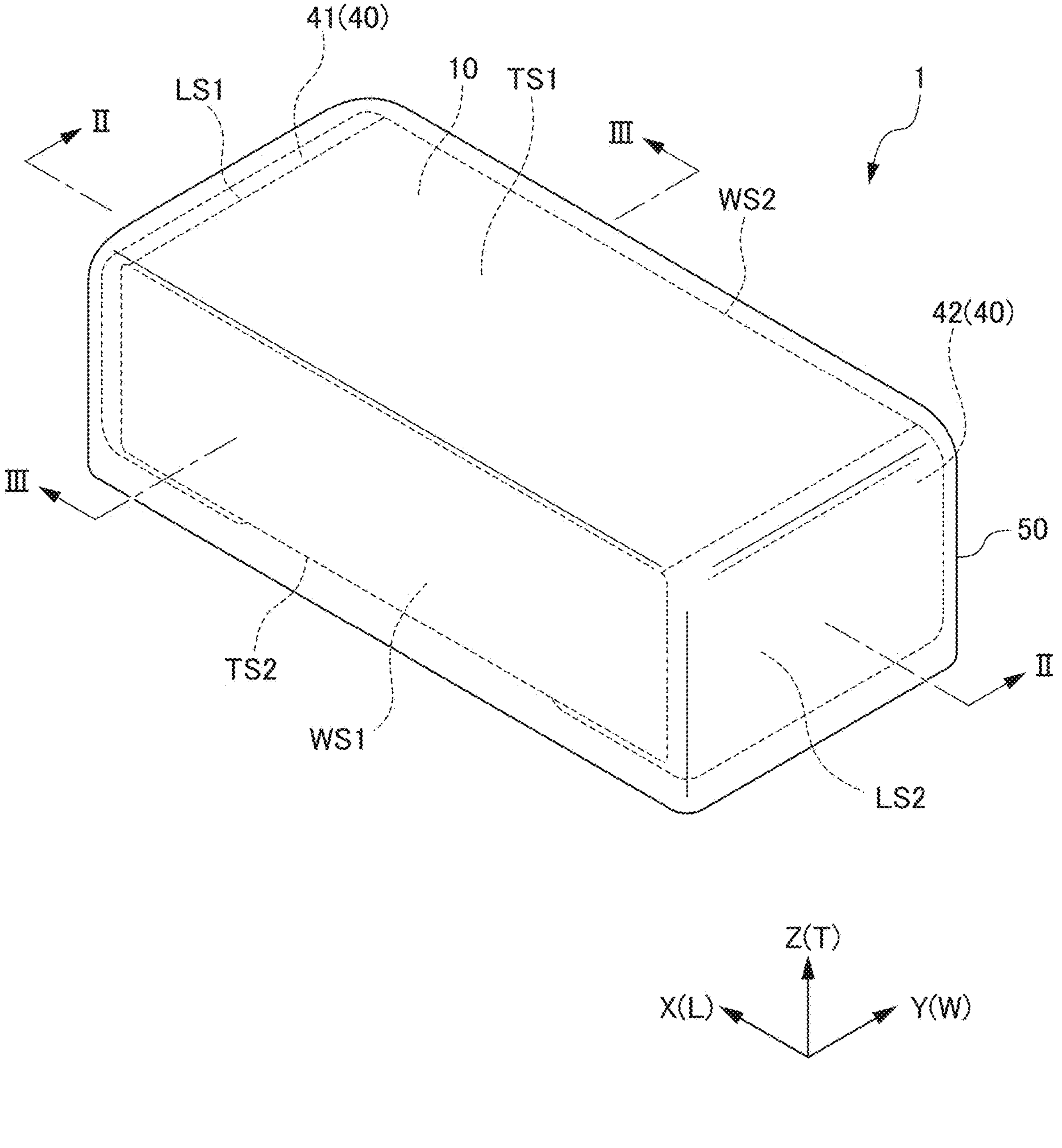
FIG. 1 is a perspective view of a multilayer ceramic capacitor according to an example embodiment of the present invention.

Hereinafter, example embodiments of the present invention will be described with reference to the accompanying drawings. The same or equivalent portions in the drawings are designated with the same reference numerals.

Multilayer Ceramic Capacitor

Figure 2:
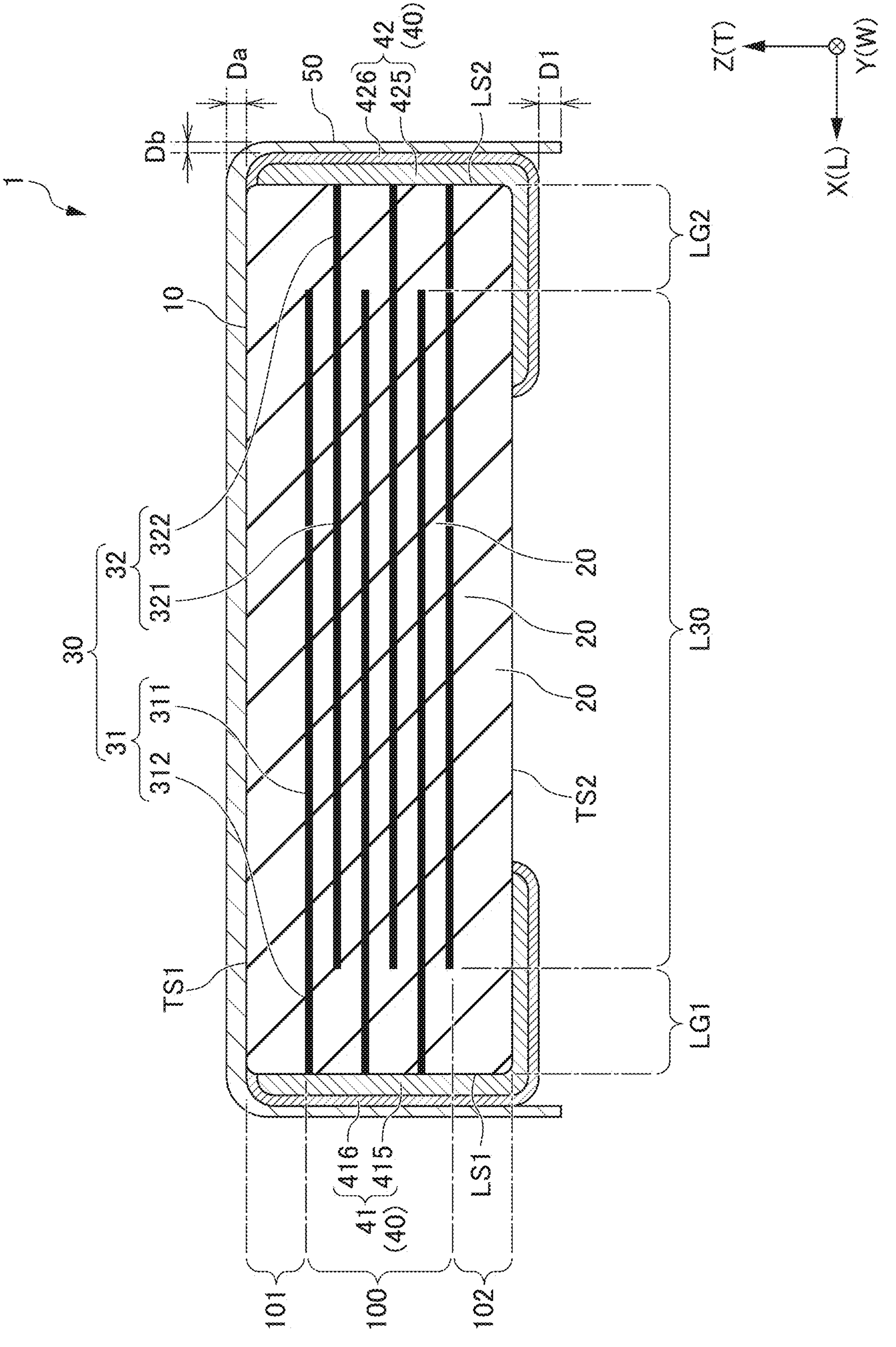
FIG. 2 is a cross-sectional view of the multilayer ceramic capacitor taken along the line II-II in FIG. 1 (LT cross-section).
Figure 3:
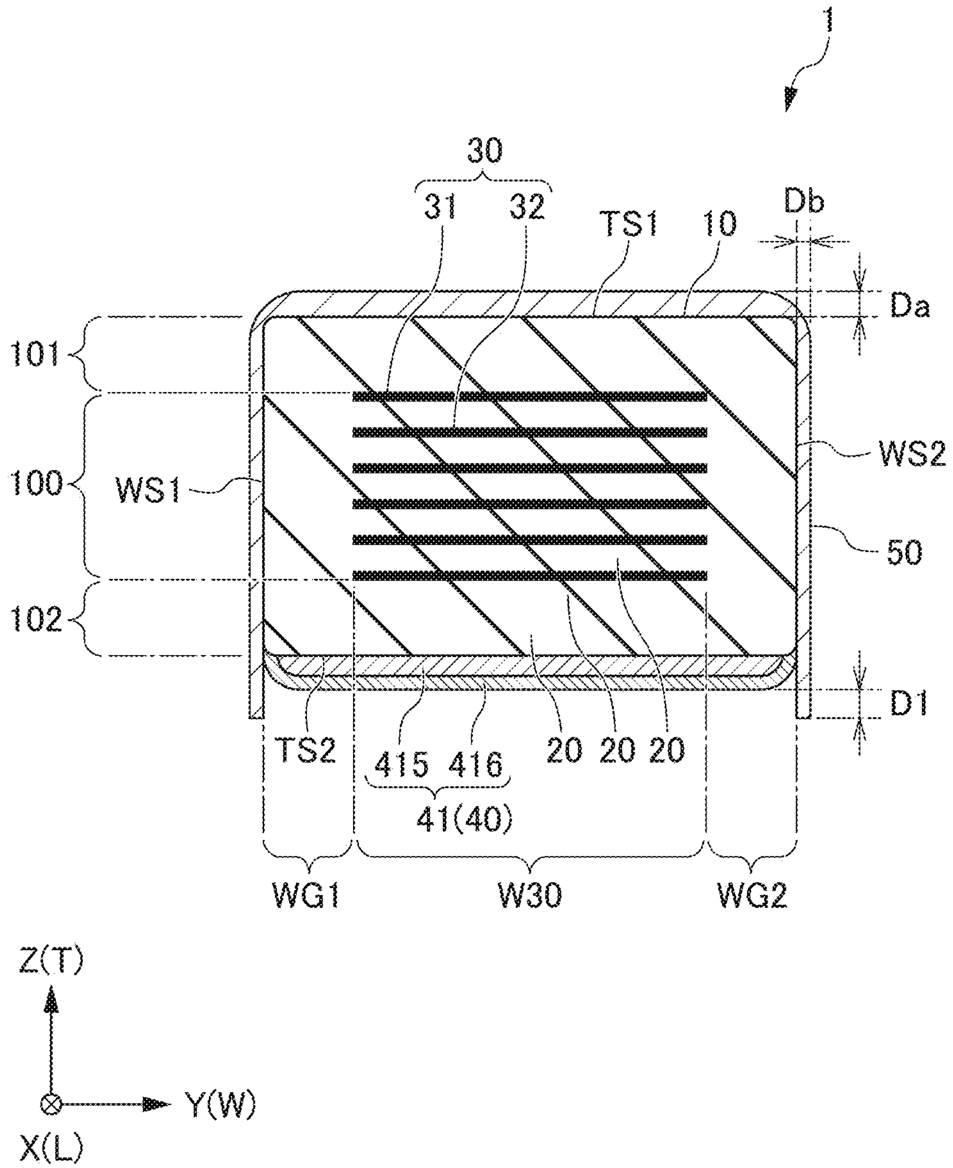
FIG. 3 is a cross-sectional view of the multilayer ceramic capacitor taken along the line III-III in FIG. 1 (WT cross-section).

FIG. 1 is a perspective view of a multilayer ceramic capacitor according to an example embodiment, FIG. 2 is a cross-sectional view of the multilayer ceramic capacitor taken along the line II-II in FIG. 1, and FIG. 3 is a cross-sectional view of the multilayer ceramic capacitor taken along the line III-III in FIG. 1. A multilayer ceramic capacitor 1 illustrated in FIGS. 1 to 3 includes a multilayer body 10, external electrodes 40, and a stress relief film 50. The external electrodes 40 include a first external electrode 41 and a second external electrode 42.

FIGS. 1 to 3 and subsequent drawings illustrate an XYZ orthogonal coordinate system. The X direction corresponds to the length direction L of the multilayer ceramic capacitor 1 and the multilayer body 10, the Y direction corresponds to the width direction W of the multilayer ceramic capacitor 1 and the multilayer body 10, and the Z direction corresponds to the lamination direction T of the multilayer ceramic capacitor 1 and the multilayer body 10. Accordingly, the cross-section illustrated in FIG. 2 is also referred to as the LT cross-section, and the cross-section illustrated in FIG. 3 is also referred to as the WT cross-section.

The length direction L, the width direction W, and the lamination direction T are not necessarily orthogonal to each other, and may intersect with each other.

The multilayer body 10 has a substantially rectangular shape, and includes a first main surface TS1 and a second main surface TS2 on opposite sides in the lamination direction T, a first lateral surface WS1 and a second lateral surface WS2 on opposite sides in the width direction W, and a first end surface LS1 and a second end surface LS2 on opposite sides in the length direction L.

The corners and edge lines of the multilayer body 10 are preferably rounded. The corners refer to the portions where three surfaces of the multilayer body 10 intersect, and the edge lines refer to the portions where two surfaces of the multilayer body 10 intersect.

As illustrated in FIGS. 2 and 3, the multilayer body 10 includes a plurality of dielectric layers 20 and a plurality of internal electrode layers 30, stacked in the lamination direction T. The multilayer body 10 includes an inner layer portion 100 as well as a first outer layer portion 101 and a second outer layer portion 102 sandwiching the inner layer portion 100 in the lamination direction T.

The inner layer portion 100 includes a portion of the dielectric layers 20 and the plurality of internal electrode layers 30. Within the inner layer portion 100, the internal electrode layers 30 are provided facing each other across the dielectric layers 20. The inner layer portion 100 substantially functions as a capacitor by generating capacitance.

The first outer layer portion 101 is provided on the first main surface TS1 side of the multilayer body 10, while the second outer layer portion 102 is provided on the second main surface TS2 side of the multilayer body 10. More specifically, among the plurality of internal electrode layers 30, the first outer layer portion 101 is provided between the first main surface TS1 and an internal electrode layer 30 closest to the first main surface TS1, and the second outer layer portion 102 is provided between the second main surface TS2 and another internal electrode layer 30 closest to the second main surface TS2. The first outer layer portion 101 and the second outer layer portion 102 do not include any internal electrode layers 30, and each includes dielectric layers 20 that are not part of the inner layer portion 100. The first outer layer portion 101 and the second outer layer portion 102 function as protective layers for the inner layer portion 100.

The material for the dielectric layers 20 can include dielectric ceramics primarily composed of compounds such as $BaTiO_3$, $CaTiO_3$, $SrTiO_3$, or $CaZrO_3$. The material for the dielectric layers 20 may include compounds of Mn, Fe, Cr, Co, or Ni as secondary components added. More specifically, the dielectric layers 20 include a plurality of dielectric grains. These dielectric grains are barium titanate-based ceramics, such as perovskite-type compounds including Ba and Ti. The dielectric grains may include at least one of La, Ce, Pr, Nd, Sm, Eu, Gd, Tb, Dy, Ho, Er, Tm, Yb, Lu, or Y as secondary components.

The thickness of the dielectric layers 20 is not particularly limited but may be between about 0.30 μm and about 5.00 μm inclusive, for example. The number of the dielectric layers 20 is not particularly limited but may be between 5 layers and 2000 layers inclusive, for example. The number of the dielectric layers 20 is the total of the number of dielectric layers in the inner layer portion and the number of dielectric layers in the outer layer portions.

As illustrated in FIGS. 2 and 3, the plurality of internal electrode layers 30 include a plurality of first internal electrode layers 31 and a plurality of second internal electrode layers 32. The plurality of first internal electrode layers 31 and the plurality of second internal electrode layers 32 are alternately provided in the lamination direction T of the multilayer body 10.

The first internal electrode layer 31 includes counter electrode portions 311 and extension electrode portions 312, and the second internal electrode layer 32 includes counter electrode portions 321 and extension electrode portions 322.

The counter electrode portion 311 and the counter electrode portion 321 face each other across the dielectric layers 20 in the lamination direction T of the multilayer body 10. The shape of the counter electrode portion 311 and the counter electrode portion 321 is not particularly limited, and may be substantially rectangular, for example. The counter electrode portion 311 and the counter electrode portion 321 are the portions (effective region) that effectively function as a capacitor by generating capacitance.

The extension electrode portion 312 extends from the counter electrode portion 311 toward the first end surface LS1 of the multilayer body 10 and is exposed at the first end surface LS1. The extension electrode portion 322 extends from the counter electrode portion 321 toward the second end surface LS2 of the multilayer body 10 and is exposed at the second end surface LS2. The shape of the extension electrode portion 312 and the extension electrode portion 322 is not particularly limited, and may be substantially rectangular, for example.

Thus, the first internal electrode layer 31 is connected to the first external electrode 41, and there is a gap between the first internal electrode layer 31 and the second end surface LS2 of the multilayer body 10, i.e., the second external electrode 42. The second internal electrode layer 32 is connected to the second external electrode 42, and there is a gap between the second internal electrode layer 32 and the first end surface LS1 of the multilayer body 10, i.e., the first external electrode 41.

The first internal electrode layers 31 and the second internal electrode layers 32 primarily include the metal Ni. The first internal electrode layers 31 and the second internal electrode layers 32 may include at least one selected from metals such as Cu, Ag, Pd, Au, or an alloy such as an Ag—Pd alloy including at least one of these metals, either as a principal component or non-principal component. Furthermore, the first internal electrode layers 31 and the second internal electrode layers 32 may also include particles of a dielectric material from the same compositional family as the ceramic included in the dielectric layers 20, as a non-principal component. In this specification, the principal metal component is defined as the metal component with the highest weight percentage.

The thickness of the first internal electrode layers 31 and the second internal electrode layers 32 is not particularly limited, but may be, for example, between about 0.30 μm and about 1.00 μm inclusive. The number of the first internal electrode layers 31 and the second internal electrode layers 32 is also not particularly limited but may be, for example, between 5 layers and 2000 layers inclusive.

As illustrated in FIG. 3, in the width direction W, the multilayer body 10 includes an electrode counter portion W30 in which the internal electrode layers 30 face each other, and a first side gap portion WG1 and a second side gap portion WG2, which are provided to sandwich the electrode counter portion W30. The first side gap portion WG1 is provided between the electrode counter portion W30 and the first lateral surface WS1, and the second side gap portion WG2 is provided between the electrode counter portion W30 and the second lateral surface WS2. More specifically, the first side gap portion WG1 is provided between the end of the internal electrode layer 30 on the first lateral surface WS1 side and the first lateral surface WS1, and the second side gap portion WG2 is provided between the end of the internal electrode layer 30 on the second lateral surface WS2 side and the second lateral surface WS2. The first side gap portion WG1 and the second side gap portion WG2 include only the dielectric layers 20 and do not include internal electrode layers 30. The first side gap portion WG1 and the second side gap portion WG2 function as protective layers for the internal electrode layers 30. The first side gap portion WG1 and the second side gap portion WG2 are also referred to as W gaps.

As illustrated in FIG. 2, in the length direction L, the multilayer body 10 includes an electrode counter portion L30 in which the first internal electrode layers 31 and the second internal electrode layers 32 of the internal electrode layer 30 face each other, and a first end gap portion LG1 and a second end gap portion LG2. The first end gap portion LG1 is provided between the electrode counter portion L30 and the first end surface LS1, and the second end gap portion LG2 is provided between the electrode counter portion L30 and the second end surface LS2. More specifically, the first end gap portion LG1 is provided between the first end surface LS1 and the end of the second internal electrode layer 32 on the first end surface LS1 side, and the second end gap portion LG2 is provided between the second end surface LS2 and the end of the first internal electrode layer 31 on the second end surface LS2 side. The first end gap portion LG1 does not include the second internal electrode layer 32 but includes the first internal electrode layer 31 and the dielectric layers 20, whereas the second end gap portion LG2 does not include the first internal electrode layer 31 but includes the second internal electrode layer 32 and the dielectric layers 20. The first end gap portion LG1 functions as an extension electrode portion for the first internal electrode layer 31 towards the first end surface LS1, and the second end gap portion LG2 functions as an extension electrode portion for the second internal electrode layer 32 towards the second end surface LS2. The first end gap portion LG1 and the second end gap portion LG2 are also referred to as L gaps.

The electrode counter portion L30 houses the counter electrode portions 311 of the first internal electrode layer 31 and the counter electrode portions 321 of the second internal electrode layer 32 as previously described. The first end gap portion LG1 houses the extension electrode portion 312 of the first internal electrode layer 31 as previously described, and the second end gap portion LG2 houses the extension electrode portion 322 of the second internal electrode layer 32 as previously described.

The dimensions of the multilayer body 10 as described above are not particularly limited, but, for example, the length in the length direction L may be between about 0.05 mm and about 1.00 mm inclusive, the width in the width direction W may be between about 0.10 mm and about 0.50 mm inclusive, and the thickness in the lamination direction T may be between about 0.10 mm and about 0.50 mm inclusive. The dimensions of the multilayer ceramic capacitor 1, including the external electrodes 40 to be described later, are not particularly limited either, but, for example, the length in the length direction L may be between about 0.05 mm and about 1.00 mm inclusive, the width in the width direction W may be between about 0.10 mm and about 0.50 mm inclusive, and the thickness in the lamination direction T may be between about 0.10 mm and about 0.50 mm inclusive.

A method of measuring the thickness of the dielectric layers 20 and the internal electrode layers 30 may involve, for example, using a scanning electron microscope (SEM) to observe an LT cross-section near the central area in the width direction of the multilayer body, which has been exposed by polishing. The values obtained may be averages of measurements from a plurality of points in the length direction, or averages of measurements from a plurality of points in the lamination direction.

Similarly, a method of measuring the thickness of the multilayer body 10 or the multilayer ceramic capacitor 1 may involve, for example, using SEM to observe an LT cross-section near the central area in the width direction of the multilayer body which has been exposed by polishing, or a WT cross-section near the central area in the length direction of the multilayer body or multilayer ceramic capacitor which has been exposed by polishing. The values obtained may be averages of measurements from a plurality of points in either the length direction or the width direction. Similarly, a method of measuring the length of the multilayer body 10 or the multilayer ceramic capacitor 1 may involve, for example, using SEM to observe an LT cross-section near the central area in the width direction of the multilayer body or the multilayer ceramic capacitor, which has been exposed by polishing. The values obtained may be averages of measurements from a plurality of points in the lamination direction. Similarly, a method of measuring the width of the multilayer body 10 or the multilayer ceramic capacitor 1 may involve, for example, using SEM to observe a WT cross-section near the central area in the length direction of the multilayer body or multilayer ceramic capacitor, which has been exposed by polishing. The values obtained may be averages of measurements from a plurality of points in the lamination direction.

The external electrodes 40 include a first external electrode 41 and a second external electrode 42.

The first external electrode 41 is provided on at least the second main surface TS2 of the multilayer body 10, specifically on a portion of the first end surface LS1 side of the second main surface TS2. In the examples illustrated in FIGS. 1 to 3, the first external electrode 41 is also provided on the first end surface LS1 of the multilayer body 10 and is connected to the first internal electrode layer 31. Specifically, the first external electrode 41 is L-shaped or substantially L-shaped in the LT cross-section, and is provided along a portion of the first end surface LS1 side of the second main surface TS2 of the multilayer body 10 and along the first end surface LS1. In the examples of FIGS. 1 to 3, the first external electrode 41 is not provided on the first main surface TS1 or the two lateral surfaces WS1 and WS2.

The second external electrode 42 is provided on at least the second main surface TS2 of the multilayer body 10, specifically on a portion of the second end surface LS2 side of the second main surface TS2. In the examples illustrated in FIGS. 1 to 3, the second external electrode 42 is also provided on the second end surface LS2 of the multilayer body 10 and is connected to the second internal electrode layer 32. Specifically, the second external electrode 42 is L-shaped or substantially L-shaped and provided along a portion of the second end surface LS2 side of the second main surface TS2 of the multilayer body 10 and along the second end surface LS2. In the examples of FIGS. 1 to 3, the second external electrode 42 is not provided on the first main surface TS1 or the two lateral surfaces WS1 and WS2.

The first external electrode 41 includes a first base electrode layer 415 and a first plated layer 416, while the second external electrode 42 includes a second base electrode layer 425 and a second plated layer 426. The first external electrode 41 may consist solely of the first plated layer 416, and similarly, the second external electrode 42 may consist solely of the second plated layer 426.

The first base electrode layer 415 and the second base electrode layer 425 may be a fired layer including metal and glass. The glass component may include at least one selected from B, Si, Ba, Mg, Al, or Li. For example, borosilicate glass can be used. The metal component may include Cu as the principal component. The metal may include at least one selected from metals such as Ni, Ag, Pd, or Au, or alloys such as an Ag—Pd alloy, as a principal component or non-principal component.

The fired layer is a layer formed by applying an electrically conductive paste including metal and glass to the multilayer body using a dip-coating method followed by firing. This layer may be fired after or simultaneously with firing the internal electrode layers. The fired layer may include a plurality of layers.

Alternatively, the first base electrode layer 415 and the second base electrode layer 425 may be resin layers including electrically conductive particles and thermosetting resin. These resin layers may be formed on top of the fired layer or directly on the multilayer body without forming a fired layer.

The resin layer is a layer formed by applying an electrically conductive paste including electrically conductive particles and thermosetting resin to the multilayer body using a coating method followed by firing. This layer may be fired after or simultaneously with firing the internal electrode layers. The resin layer may include a plurality of layers.

The thickness of each of the first base electrode layer 415 and the second base electrode layer 425, whether a fired layer or a resin layer, is not particularly limited but may be between about 1 μm and about 10 μm inclusive, for example.

Alternatively, the first base electrode layer 415 and the second base electrode layer 425 may be formed using a thin film deposition method such as sputtering or evaporation, and may consist of a thin film layer of metal particles deposited to a thickness of about 1 μm or less, for example.

The first plated layer 416 covers at least a portion of the first base electrode layer 415, and the second plated layer 426 covers at least a portion of the second base electrode layer 425. The materials for the first plated layer 416 and the second plated layer 426 may include at least one selected from metals such as Cu, Ni, Ag, Pd, Au, or alloys such as an Ag—Pd alloy.

The first plated layer 416 and the second plated layer 426 may include a plurality of layers. A two-layer structure including Ni plating and Sn plating is preferable. The Ni plated layer can prevent the base electrode layer from being eroded by solder during the mounting of ceramic electronic components, and the Sn plated layer can improve the wettability of the solder during the mounting of ceramic electronic components, facilitating easier mounting.

The thickness of each of the first plated layer 416 and the second plated layer 426 is not particularly limited but may be between about 1 μm and about 10 μm inclusive, for example.

Stress Relief Film

The stress relief film 50 mitigates the stress applied to the multilayer body 10 and the external electrodes 40. The stress relief film 50 extends along the first main surface (top surface) TS1 and the two end surfaces LS1, LS2, covering the multilayer body 10 and the external electrodes 40, and also extends along the first main surface TS1 and the two lateral surfaces WS1, WS2.

The end portion of the stress relief film 50 protrudes by a distance D1 from the outermost surface (surface closest to the bottom surface) of the external electrodes 40, on the second main surface (bottom surface, mounting surface) TS2. The protrusion dimension D1 of the stress relief film 50 may be between about 5 μm and about 10 μm inclusive, for example. D1 of about 5 μm or more enhances the stress mitigation effect, and D1 of about 10 μm or less maintains connectivity with the paste solder to the external electrodes 40, for example.

The thickness Da of the main surface portion (first portion) of the stress relief film 50 along the first main surface TS1, and the thickness Db of the lateral surface portion (second portion) along the two end surfaces LS1, LS2 and the two lateral surfaces WS1, WS2, satisfy the following relationship:

about $0.8\,Da \geq Db$

The thickness Da of the main surface portion (first portion) may be between about 4.5 μm and about 5.5 μm inclusive, for example.

When the thickness Da of the main surface portion (first portion) is relatively thick, the main surface portion along the first main surface TS1 of the stress relief film 50 can absorb the suction force applied by the mounter on the top surface, which is the first main surface TS1 side, thereby mitigating the suction force exerted on the multilayer body 10. On the other hand, when the thickness Db of the lateral surface portion (second portion) is relatively thin, the size of the solder pad on the mounting board can be reduced, facilitating high-density mounting.

The stress relief film 50 includes an insulating material. As a result, short circuits can be prevented across the external electrodes 40.

The strength of the stress relief film 50 is preferably greater than the strength of the plurality of dielectric layers 20 of the multilayer body 10. Specifically, in terms of the strength against the stress applied during mounting using a mounter, the strength of the stress relief film 50 is preferably greater than the strength of the plurality of dielectric layers 20 of the multilayer body 10. For example, the Young's modulus of the stress relief film 50 is preferably between about 400 GPa and about 1500 GPa inclusive, for example.

From an insulation and strength perspective, suitable materials for the stress relief film 50 may include diamond-like carbon or glass. Among these, diamond-like carbon is particularly preferred as the material for the stress relief film 50.

Manufacturing Method

Next, a non-limiting example of a manufacturing method for the previously described multilayer ceramic capacitor 1 is described. First, dielectric sheets for the dielectric layers 20 and an electrically conductive paste for the internal electrode layers 30 are prepared. The dielectric sheets and the electrically conductive paste include binders and solvents. Well-known materials can be used for the binders and solvents.

Next, for example, the electrically conductive paste is printed in predetermined patterns on the dielectric sheets, thereby forming internal electrode patterns on the dielectric sheets. Methods such as screen printing or gravure printing can be used to form the internal electrode patterns.

Then, a predetermined number of dielectric sheets for the second outer layer portion 102, which do not include the internal electrode patterns printed thereon, are stacked. On top of these, dielectric sheets for the inner layer portion 100, which include the internal electrode patterns printed, are sequentially stacked. Then, a predetermined number of dielectric sheets for the first outer layer portion 101, which do not include the internal electrode patterns printed, are stacked on top. This process creates a multilayer sheet.

Next, the multilayer sheet is pressed in the lamination direction by means such as a hydrostatic press to create a multilayer block. Then, the multilayer block is cut to a desired size to produce multilayer chips. At this point, dielectric sheets for the first side margin portion W11 and the second side margin portion W12 may be attached to the lateral surfaces of the multilayer chips. In this case, the corners and the edge lines of the multilayer chips are rounded by processes such as barrel polishing. Then, the multilayer chips are fired to create the multilayer body 10. The firing temperature should preferably be between, for example, about 900° C. and about 1400° C. inclusive, depending on the materials of the dielectric and the internal electrodes.

Next, an electrically conductive paste as an electrode material for the base electrode layers (for the first base electrode layer 415) is applied using a coating method to the second main surface TS2 and the first end surface LS1 of the multilayer body 10. Similarly, an electrically conductive paste as an electrode material for the base electrode layers (for the second base electrode layer 425) is applied using a coating method to the second main surface TS2 and the second end surface LS2 of the multilayer body 10. Afterwards, these electrically conductive pastes are fired to form the fired layers, which are the first base electrode layer 415 and the second base electrode layer 425. The firing temperature should preferably be between about 600° C. and about 900° C. inclusive, for example.

Alternatively, thin film deposition methods such as sputtering or evaporation may be used to form thin films, specifically the first base electrode layer 415 and the second base electrode layer 425.

In the described process, the base electrode layers are formed and fired after the multilayer chips have been fired, meaning that the multilayer body and external electrodes are fired separately. However, the base electrode layers may be formed and fired before firing the multilayer chips, thus allowing for the simultaneous firing of the multilayer body and external electrodes.

Subsequently, the first plated layer 416 is formed on the surface of the first base electrode layer 415 to create the first external electrode 41, and the second plated layer 426 is formed on the surface of the second base electrode layer 425 to create the second external electrode 42.

Next, the stress relief film 50 is formed to cover the multilayer body 10 and the external electrodes 40. Methods such as sputtering or other Physical Vapor Deposition (PVD) techniques, or evaporation, may be used to form the stress relief film 50. During this process, the protrusion dimension D1 of the stress relief film 50 can be adjusted by modifying the height of the mounting fixture. The shape of the protruding portions illustrated in FIG. 1, and later in FIGS. 4, 7, and 10 to 12, may be altered with the mounting fixture. Through these steps, the previously described multilayer ceramic capacitor 1 is obtained.

In conventional multilayer ceramic capacitors without a stress relief film 50, when the multilayer ceramic capacitor is thinned, the strength of the multilayer body 10, particularly the ceramic layers (dielectric layers 20), decreases, potentially damaging the multilayer ceramic capacitor due to the stress applied by the mounter during mounting. For instance, during mounting using a mounter, stress applied to the top surface of the multilayer ceramic capacitor, which is the first main surface TS1, may result in stress on the external electrodes 40 on the bottom surface of the multilayer ceramic capacitor (mounting surface), which is the second main surface TS2, potentially damaging the multilayer ceramic capacitor. For example, cracks may occur in the ceramic layers (dielectric layers 20) of the multilayer body 10. If the cracks occurring in the ceramic layers (dielectric layers 20) extend into the internal electrode layers 30, for example, moisture may infiltrate through the cracks, reducing the insulation properties of the multilayer ceramic capacitor.

In this respect, according to the present example embodiment of the multilayer ceramic capacitor 1, the stress relief film 50 extends along the first main surface (top surface) TS1 and the two end surfaces LS1, LS2, covering the multilayer body 10 and the external electrodes 40, and also extends along the first main surface (top surface) TS1 and the two lateral surfaces WS1, WS2. The end portion of the stress relief film 50 protrudes by the distance D1 beyond the outermost surface (surface closest to the bottom surface) of the external electrodes 40, provided on the second main surface (bottom surface, mounting surface) TS2. As a result, during mounting with a mounter, the stress applied to the top surface, which is the first main surface TS1, can be dispersed from the main surface portion along the first main surface TS1 of the stress relief film 50 to the end surface portions along the two end surfaces LS1, LS2, and the lateral surface portions along the two lateral surfaces WS1, WS2, and directed towards the protruding end portions. This allows for mitigating the stress on the external electrodes 40 and the multilayer body 10 on the bottom surface (mounting surface), which is the second main surface TS2, thereby preventing cracks from occurring in the ceramic layers (dielectric layers 20) of the multilayer body 10. Thus, the multilayer ceramic capacitor 1 of the present example embodiment, even when slimmed down, can decrease or prevent the reduction in strength against external stress.

According to the present example embodiment of the multilayer ceramic capacitor 1, the main surface portion along the first main surface TS1 of the stress relief film 50 can also receive the suction force applied to the top surface, which is the first main surface TS1, during mounting with a mounter. This allows for mitigating the suction force exerted on the multilayer body 10.

According to the present example embodiment of the multilayer ceramic capacitor 1, the stress relief film 50 covers the external electrodes 40 at the end surfaces LS1, LS2 or the lateral surfaces WS1, WS2, preventing the solder paste from bulging at the end surfaces LS1, LS2 or the lateral surfaces WS1, WS2. This allows for reducing the size of solder pad on the mounting board, enabling higher-density mounting.

According to the present example embodiment of the multilayer ceramic capacitor 1, since the external electrodes 40 are not formed on the first main surface TS1 side, the number of layers in the multilayer body 10 can be increased and the capacitor effective region can be increased. Also, since the external electrodes 40 are not formed on the sides of the two lateral surfaces WS1, WS2, the area of the multilayer body 10 can be increased, which also increases the capacitor effective region.

Although the example embodiments of the present invention have been described, the present invention is not limited to these example embodiments, and various modifications and variations can be made. For example, in the described example embodiments, the stress relief film 50 extends along five surfaces: the first main surface (top surface) TS1, the two end surfaces LS1, LS2, and the two lateral surfaces WS1, WS2. However, the present invention is not limited to this configuration. The stress relief film 50 may extend along only three surfaces: the first main surface (top surface) TS1 and the two end surfaces LS1, LS2. Alternatively, the stress relief film 50 may extend along only three surfaces: the first main surface (top surface) TS1 and the two lateral surfaces WS1, WS2.

The example embodiments have described the two external electrodes 40 as being provided on a portion of the second main surface TS2 of the multilayer body 10 on the side of the two end surfaces LS1, LS2, and on the two end surfaces LS1, LS2. However, the present invention does not limit the shape, number, or placement positions of the external electrodes 40. For example, example embodiments of the present invention can be applied to configurations where the plurality of external electrodes 40 are provided on at least a portion of the second main surface TS2 of the multilayer body 10. Example embodiments of the present invention can also be applied to configurations where the plurality of external electrodes 40 are provided on at least a portion of the two lateral surfaces WS1, WS2 at the second main surface TS2. Below, some examples of the shape, number, and placement positions of the external electrodes 40 are described.

Modification Example 1

Figure 4:
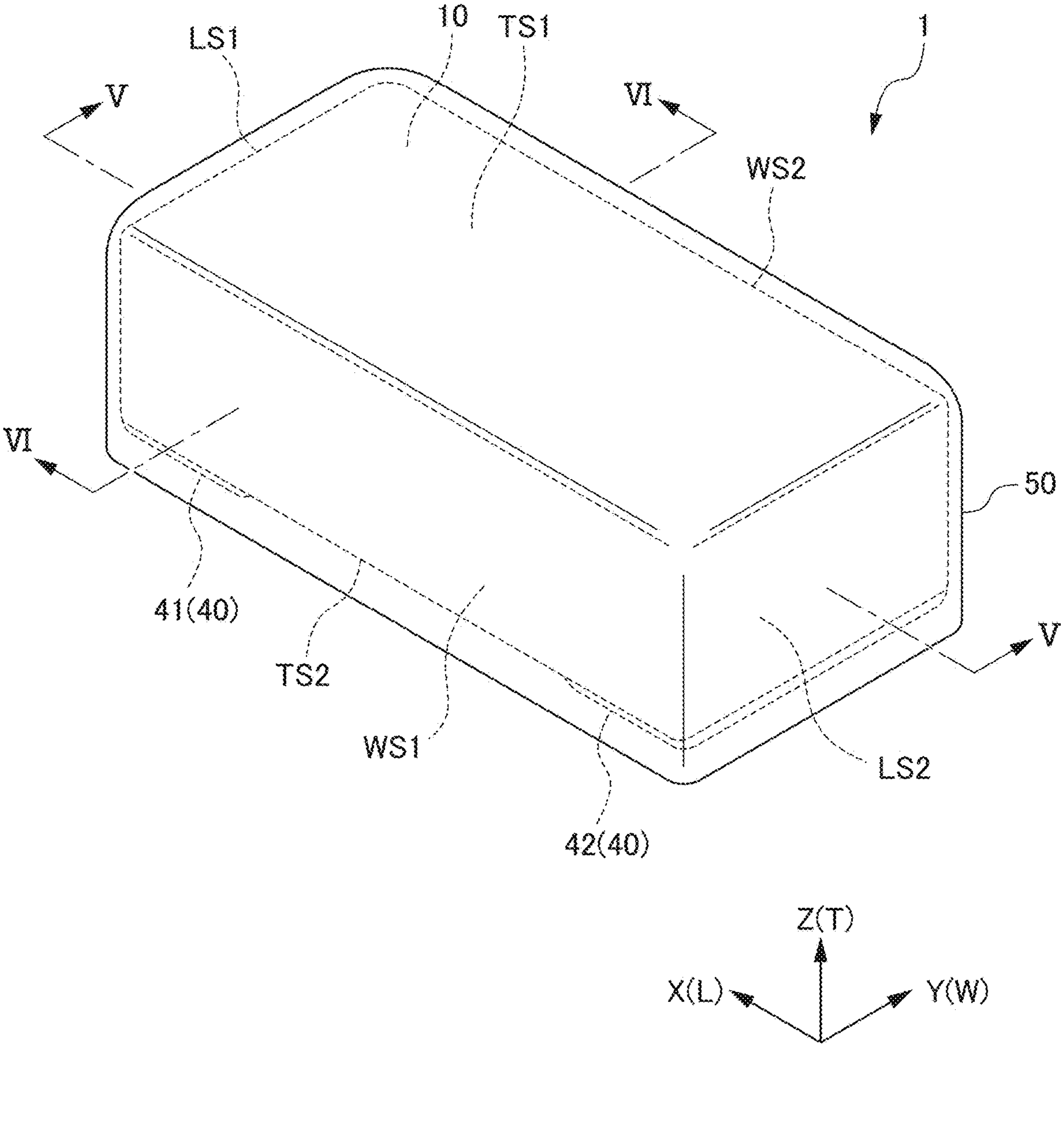
FIG. 4 is a perspective view of a multilayer ceramic capacitor according to a modification example of an example embodiment of the present invention.
Figure 5:
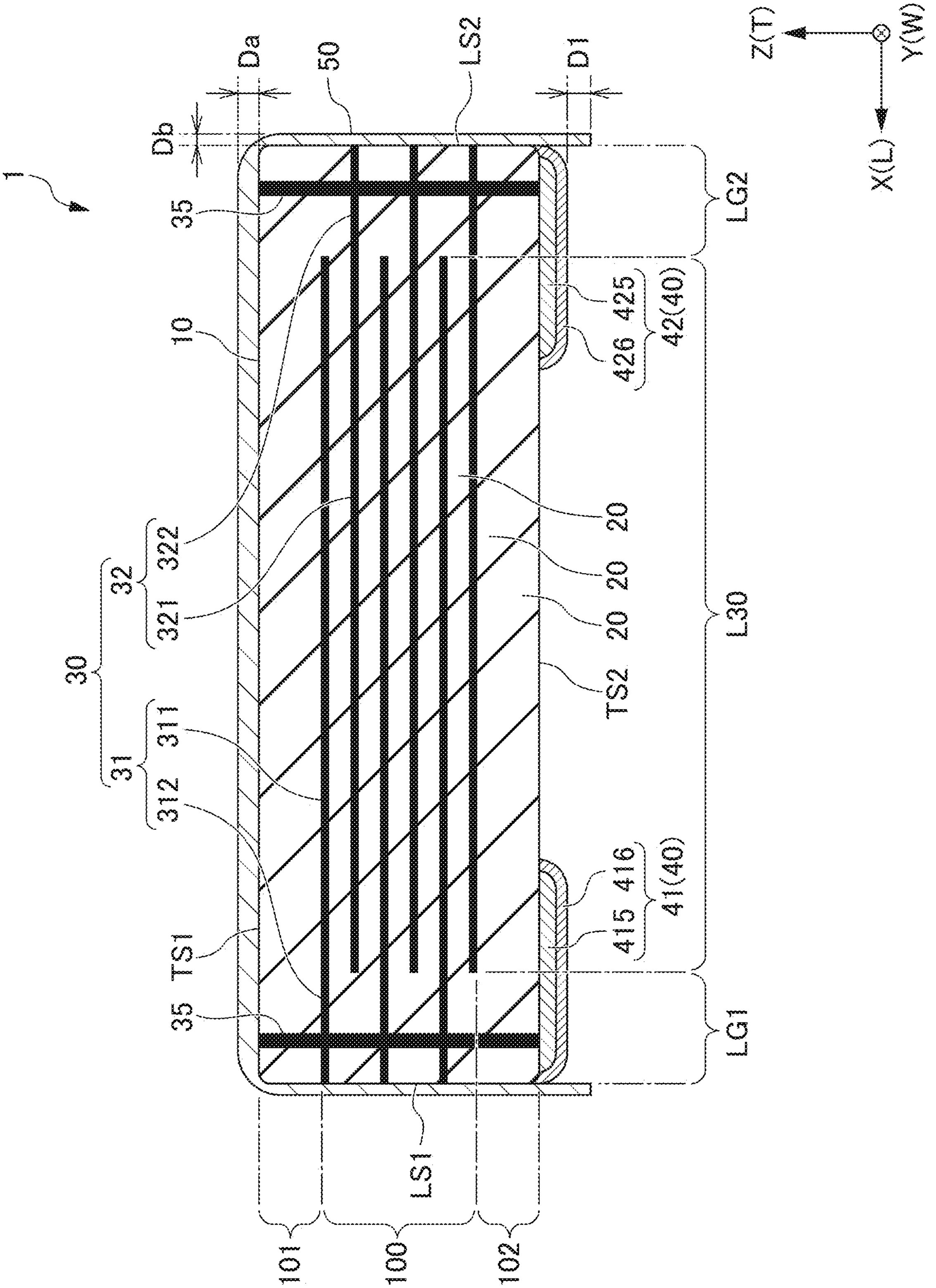
FIG. 5 is a cross-sectional view of the multilayer ceramic capacitor taken along the line V-V in FIG. 4 (LT cross-section).
Figure 6:
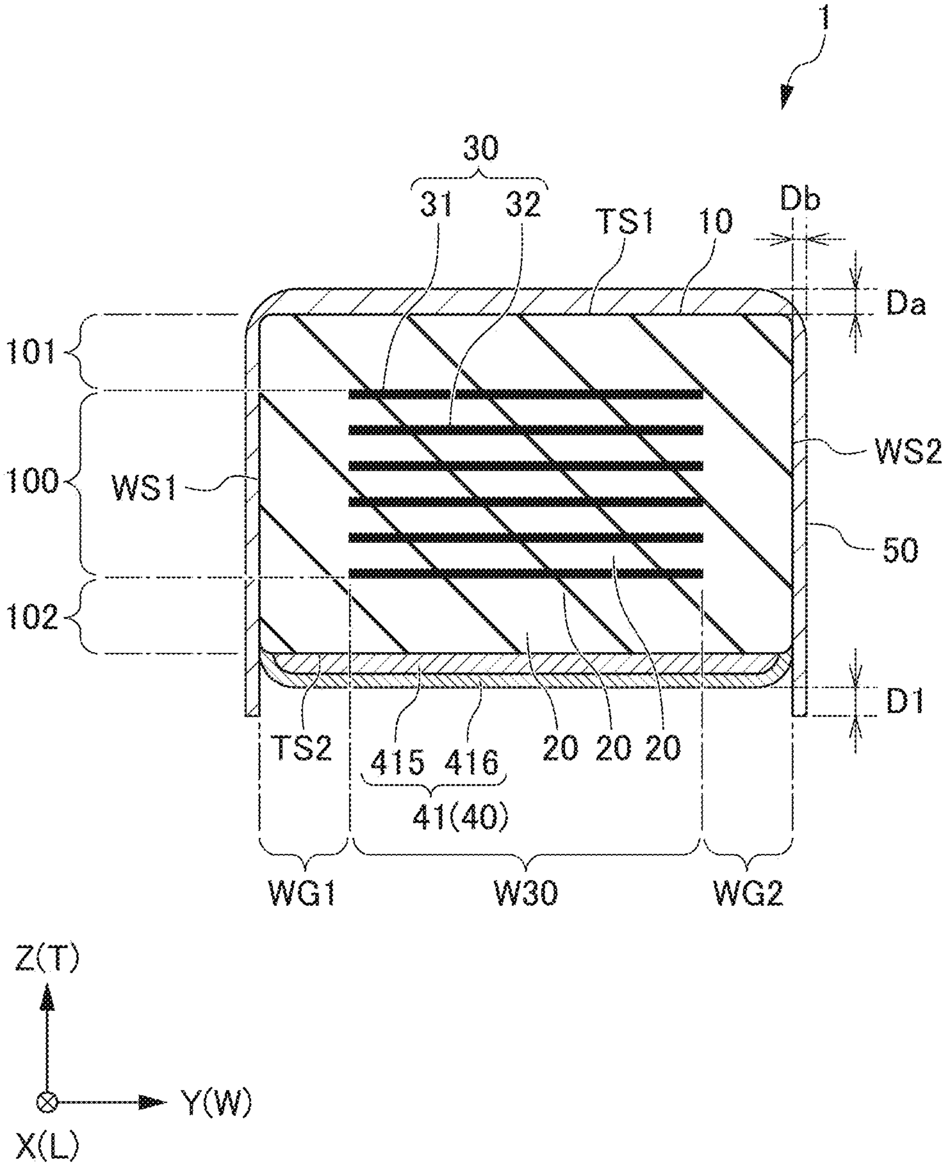
FIG. 6 is a cross-sectional view of the multilayer ceramic capacitor taken along the line VI-VI in FIG. 4 (WT cross-section).

FIG. 4 is a perspective view illustrating a multilayer ceramic capacitor according to a modification example of an example embodiment, FIG. 5 is a cross-sectional view taken along the line V-V of the multilayer ceramic capacitor illustrated in FIG. 4, and FIG. 6 is a cross-sectional view taken along the line VI-VI of the multilayer ceramic capacitor illustrated in FIG. 4. The shape of the external electrodes 40 differs between the multilayer ceramic capacitor 1 illustrated in FIGS. 4 to 6 and the multilayer ceramic capacitor 1 illustrated in FIGS. 1 to 3.

The first external electrode 41 is provided only on a portion of the second main surface (bottom surface, mounting surface) TS2 of the multilayer body 10, specifically on a portion of the first end surface LS1 side of the second main surface TS2. That is, the first external electrode 41 is not provided on the first end surface LS1, the first main surface (top surface) TS1, the first lateral surface WS1, and the second lateral surface WS2. In this case, for example, one or more vias 35 extending in the lamination direction T may connect the first external electrode 41 to the first internal electrode layer 31 on the first end surface LS1 side of the multilayer body 10.

The second external electrode 42 is provided only on a portion of the second main surface (bottom surface, mounting surface) TS2 of the multilayer body 10, specifically on a portion of the second end surface LS2 side of the second main surface TS2. That is, the second external electrode 42 is not provided on the second end surface LS2, the first main surface (top surface) TS1, the first lateral surface WS1, and the second lateral surface WS2. In this case, for example, one or more vias 35 extending in the lamination direction T may connect the second external electrode 42 to the second internal electrode layer 32 on the second end surface LS2 side of the multilayer body 10.

Although not limited, a method of forming the vias 35 may involve, for example, forming a plurality of holes provided in the width direction near the end portion of the multilayer chips after manufacturing the multilayer block as described above but before cutting out the multilayer chips, and filling the formed holes with an electrically conductive paste.

Modification Example 2

Figure 7:
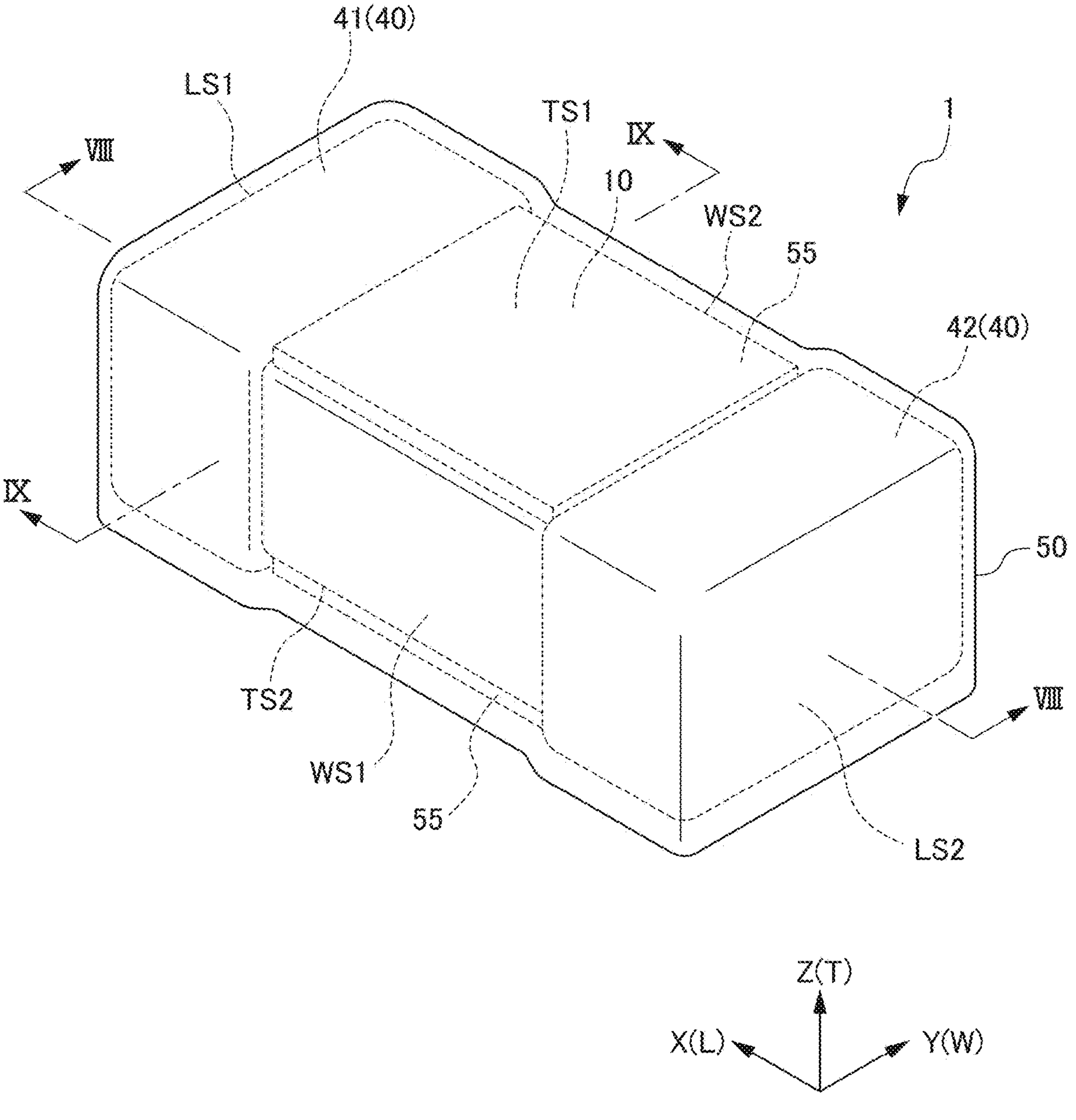
FIG. 7 is a perspective view of a multilayer ceramic capacitor according to another modification example of an example embodiment of the present invention.
Figure 8:
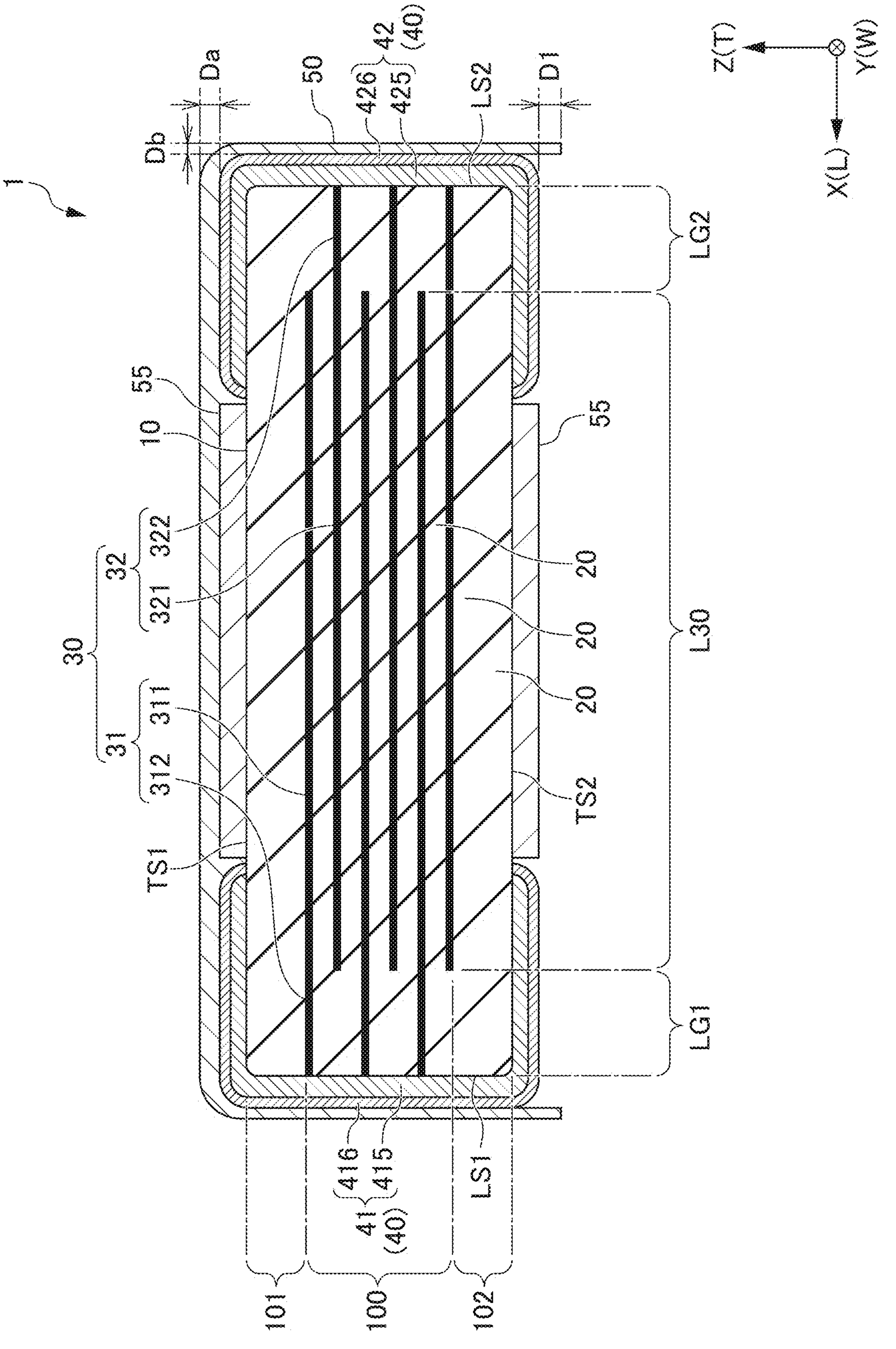
FIG. 8 is a cross-sectional view of the multilayer ceramic capacitor taken along the line VIII-VIII in FIG. 7 (LT cross-section).
Figure 9:
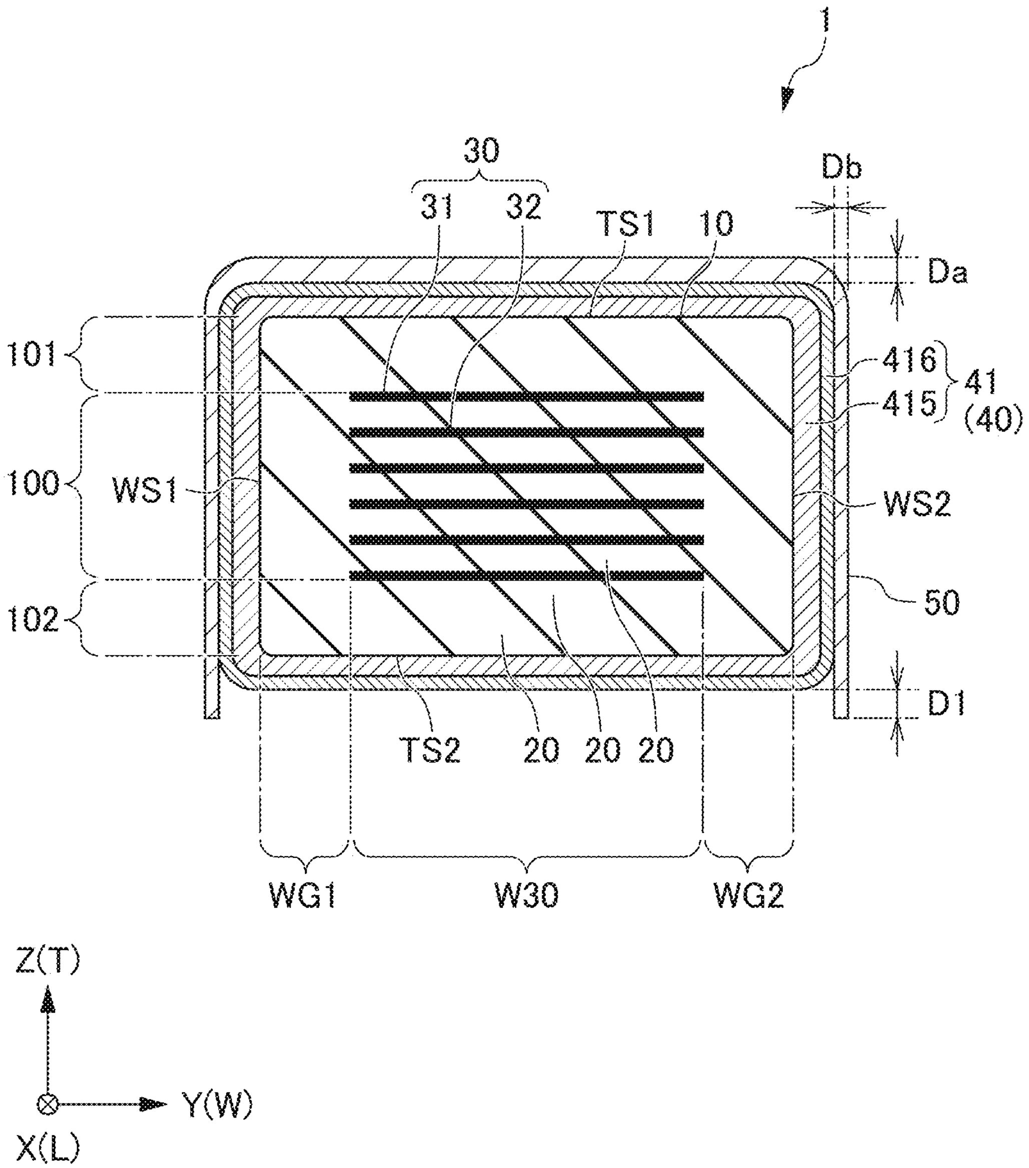
FIG. 9 is a cross-sectional view of the multilayer ceramic capacitor taken along the line IX-IX in FIG. 7 (WT cross-section).

FIG. 7 is a perspective view illustrating a multilayer ceramic capacitor according to another modification example of an example embodiment, FIG. 8 is a cross-sectional view taken along the line VIII-VIII of the multilayer ceramic capacitor illustrated in FIG. 7, and FIG. 9 is a cross-sectional view taken along the line IX-IX of the multilayer ceramic capacitor illustrated in FIG. 7. The shape of the external electrodes 40 differs between the multilayer ceramic capacitor 1 illustrated in FIGS. 7 to 9 and the multilayer ceramic capacitor 1 illustrated in FIGS. 1 to 3.

The first external electrode 41 is provided on a portion of the first end surface LS1 side of the second main surface (bottom surface, mounting surface) TS2 of the multilayer body 10, and also on the first end surface LS1, connected to the first internal electrode layer 31. In the examples illustrated in FIGS. 7 to 9, the first external electrode 41 is also provided on a portion of the first end surface LS1 side of the first main surface (top surface) TS1 of the multilayer body 10, part of the first end surface LS1 side of the first lateral surface WS1 of the multilayer body 10, and part of the first end surface LS1 side of the second lateral surface WS2 of the multilayer body 10. Thus, the first external electrode 41 has an angular U-shape in the LT cross-section and is provided along a portion of the first end surface LS1 side of the second main surface TS2 of the multilayer body 10, the first end surface LS1, and part of the first end surface LS1 side of the first main surface TS1. In the LW section, the first external electrode 41 has an angular U-shape and is provided along a portion of the first end surface LS1 side of the first lateral surface WS1 of the multilayer body 10, the first end surface LS1, and part of the first end surface LS1 side of the second lateral surface WS2.

The second external electrode 42 is provided on a portion of the second end surface LS2 side of the second main surface (bottom surface, mounting surface) TS2 of the multilayer body 10, and on the second end surface LS2, and connected to the second internal electrode layer 32. In the examples illustrated in FIGS. 7 to 9, the second external electrode 42 is also provided on a portion of the second end surface LS2 side of the first main surface (top surface) TS1 of the multilayer body 10, part of the second end surface LS2 side of the first lateral surface WS1 of the multilayer body 10, and part of the second end surface LS2 side of the second lateral surface WS2 of the multilayer body 10. Thus, the second external electrode 42 has an angular U-shape in the LT cross-section and is provided along a portion of the second end surface LS2 side of the second main surface TS2 of the multilayer body 10, the second end surface LS2, and part of the second end surface LS2 side of the first main surface TS1. In the LW section, the second external electrode 42 has an angular U-shape and is provided along a portion of the second end surface LS2 side of the first lateral surface WS1 of the multilayer body 10, the second end surface LS2, and part of the second end surface LS2 side of the second lateral surface WS2.

In this case, a flat spacer body 55 may be provided on the portion of the first main surface TS1 and the second main surface TS2 where the plurality of external electrodes 40 are not provided. In such cases, the stress relief film 50 may further extend to cover the spacer body 55 on the first main surface TS1. As a result, on the top surface, which is the first main surface TS1, the step between the portion with the external electrodes 40 and the portion without the external electrodes 40 is mitigated, thus improving the suction performance during mounting with a mounter. Since there is no distinction between the top and bottom surfaces before the formation of the stress relief film 50, the spacer body 55 is preferably provided on both the first main surface TS1 and the second main surface TS2.

Modification Example 3

Figure 10:
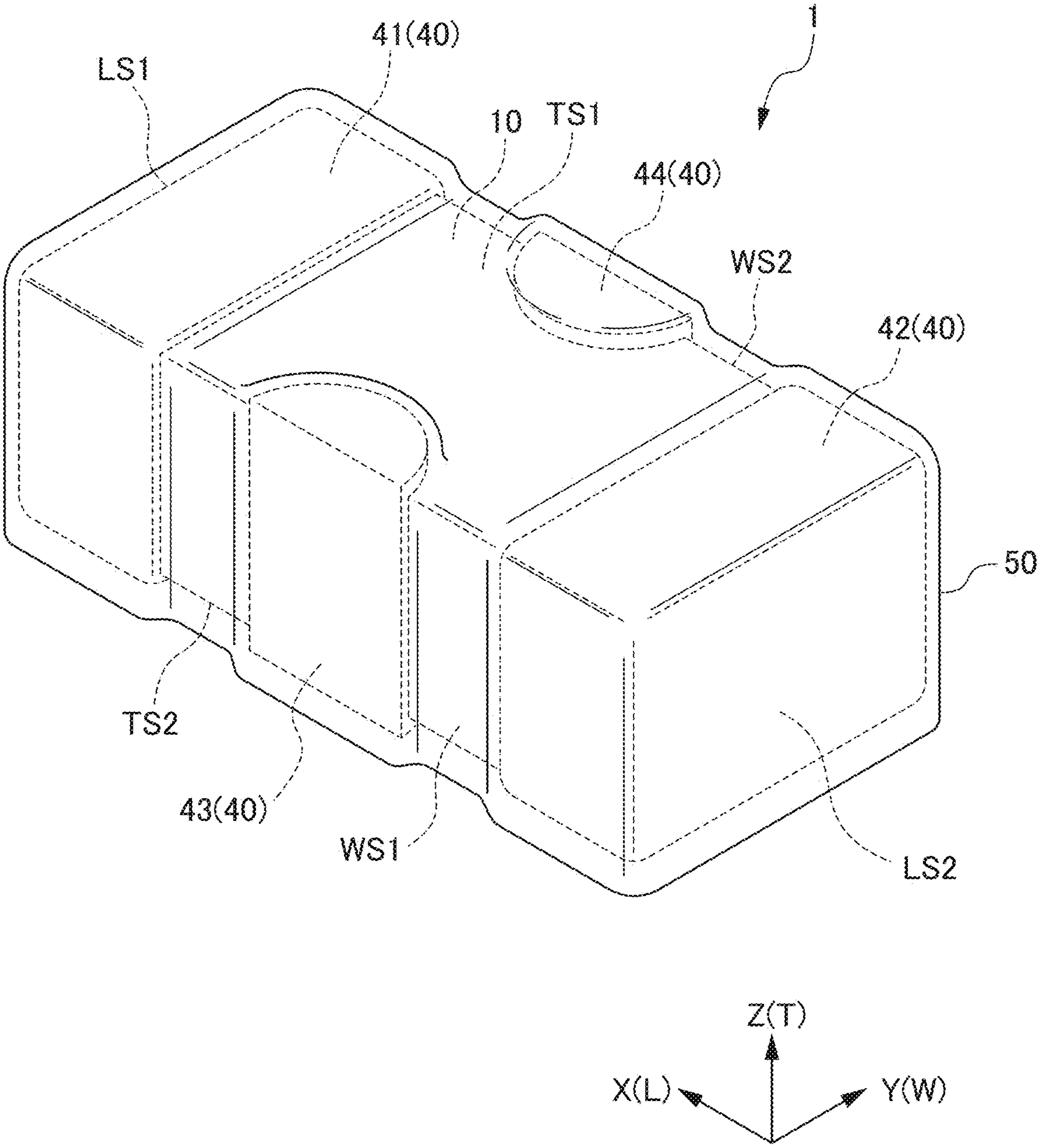
FIG. 10 is a perspective view of a multilayer ceramic capacitor according to a further modification example of an example embodiment of the present invention.

FIG. 10 is a perspective view illustrating a multilayer ceramic capacitor according to another modification example of an example embodiment. The number of external electrodes 40 differs between the multilayer ceramic capacitor 1 illustrated in FIG. 10 and the multilayer ceramic capacitor 1 illustrated in FIGS. 7 to 9.

For instance, with regard to the multilayer ceramic capacitor 1 as illustrated in FIGS. 7 to 9, the external electrodes 40 further include a third external electrode 43 and a fourth external electrode 44, in addition to the first external electrode 41 and the second external electrode 42. Thus, this multilayer ceramic capacitor 1, which includes the third external electrode 43 and the fourth external electrode 44 in addition to the first external electrode 41 and the second external electrode 42, is referred to as a three-terminal multilayer ceramic capacitor. The features of various example embodiments of the present invention can also be applied to such three-terminal multilayer ceramic capacitors.

The third external electrode 43 is provided on a portion of the first lateral surface WS1 side of the second main surface (bottom surface, mounting surface) TS2 of the multilayer body 10 and on the first lateral surface WS1, between the first external electrode 41 and the second external electrode 42. In the example illustrated in FIG. 10, the third external electrode 43 is also provided on a portion of the first lateral surface WS1 side of the first main surface (top surface) TS1 of the multilayer body 10. That is, the third external electrode 43 has an angular U-shape in the WT cross-section and is provided along a portion of the first lateral surface WS1 side of the second main surface TS2 of the multilayer body 10, the first lateral surface WS1, and part of the first lateral surface WS1 side of the first main surface TS1.

The fourth external electrode 44 is provided on a portion of the second lateral surface WS2 side of the second main surface (bottom surface, mounting surface) TS2 of the multilayer body 10 and on the second lateral surface WS2, between the first external electrode 41 and the second external electrode 42. In the example illustrated in FIG. 10, the fourth external electrode 44 is also provided on a portion of the second lateral surface WS2 side of the first main surface (top surface) TS1 of the multilayer body 10. That is, the fourth external electrode 44 has an angular U-shape in the WT cross-section and is provided along a portion of the second lateral surface WS2 side of the second main surface TS2 of the multilayer body 10, the second lateral surface WS2, and part of the second lateral surface WS2 side of the first main surface TS1.

In the multilayer ceramic capacitor 1 illustrated in FIG. 10, similar to the multilayer ceramic capacitor 1 illustrated in FIGS. 7 to 9, the flat spacer body 55 may be provided in the portions of the first main surface TS1 and the second main surface TS2 where the plurality of external electrodes 40 are not provided. In this case, the stress relief film 50 may further extend to cover the spacer body 55 on the first main surface TS1.

FIG. 10 illustrates the external electrodes 40 with an angular U-shape in cross-section. However, the features of various example embodiments of the present invention are not limited to this configuration, and the multilayer ceramic capacitor 1 as illustrated in FIG. 10 can also be applied to a multilayer ceramic capacitor 1 which includes the external electrodes 40 having an L-shaped cross-section, similar to the multilayer ceramic capacitor 1 illustrated in FIGS. 1 to 3. In this case, the third external electrode 43 is L-shaped or substantially L-shaped in the WT cross-section, and provided along a portion of the first lateral surface WS1 side of the second main surface TS2 of the multilayer body 10 and along the first lateral surface WS1. The fourth external electrode 44 is L-shaped or substantially L-shaped in the WT cross-section and provided along a portion of the second lateral surface WS2 side of the second main surface TS2 of the multilayer body 10 and along the second lateral surface WS2.

With regard to the multilayer ceramic capacitor 1 as illustrated in FIG. 10, the features of various example embodiments of the present invention can also be applied to a multilayer ceramic capacitor 1 which includes the external electrodes 40 only on the second main surface TS2, similar to the multilayer ceramic capacitor 1 illustrated in FIGS. 4 to 6.

Modification Example 4

Figure 11:
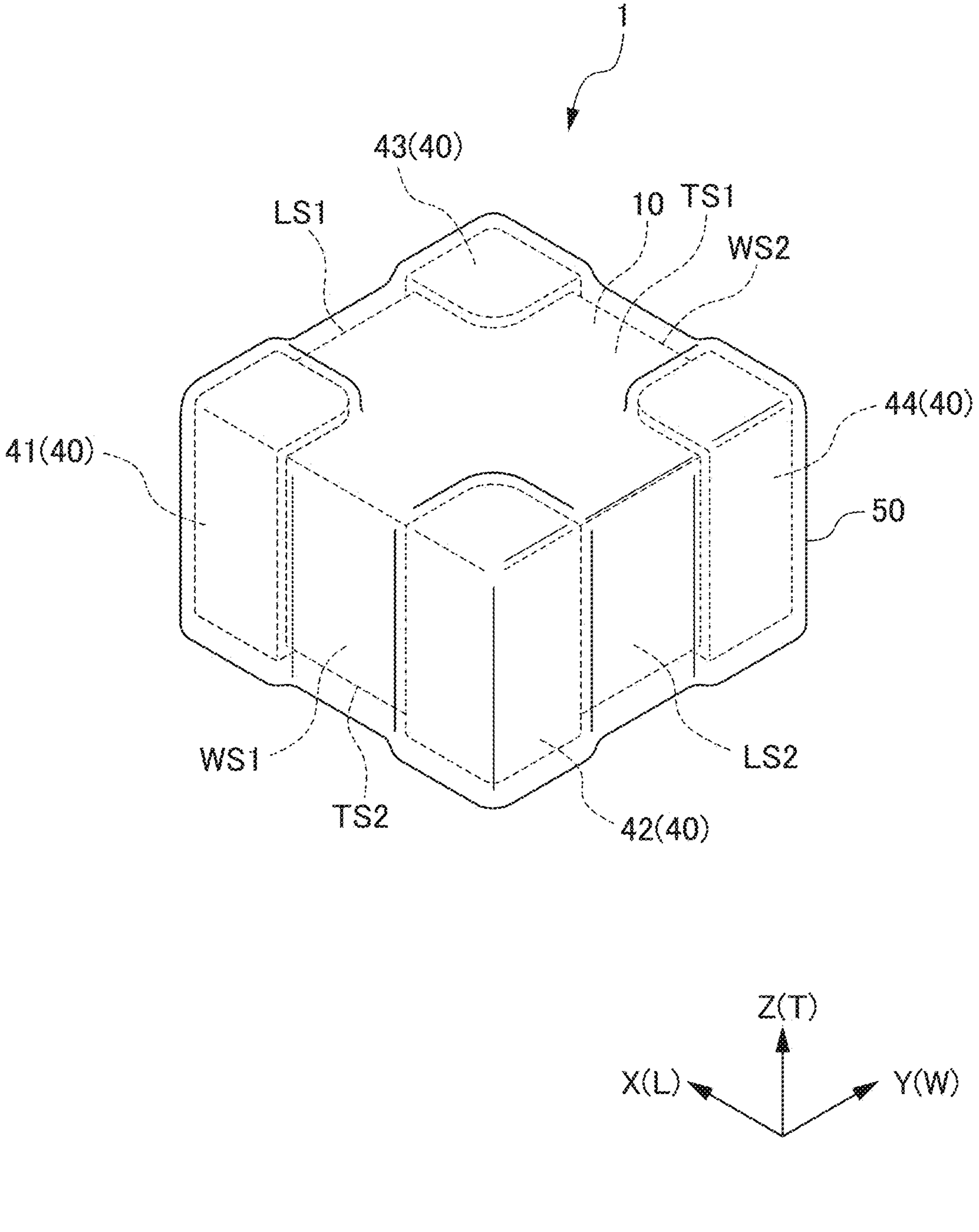
FIG. 11 is a perspective view of a multilayer ceramic capacitor according to yet another modification example of an example embodiment of the present invention.

FIG. 11 is a perspective view illustrating a multilayer ceramic capacitor according to another modification example of an example embodiment. The number and arrangement of the external electrodes 40 differ between the multilayer ceramic capacitor 1 illustrated in FIG. 11 and the multilayer ceramic capacitor 1 illustrated in FIGS. 7 to 9.

For example, the external electrodes 40 include the first external electrode 41, the second external electrode 42, the third external electrode 43, and the fourth external electrode 44, provided at the four corners of the multilayer body 10 when viewed from the second main surface TS2 side. Such a multilayer ceramic capacitor 1 can include, for example, two multilayer ceramic capacitor elements, one between the first external electrode 41 and the second external electrode 42, and another between the third external electrode 43 and the fourth external electrode 44. This feature of an example embodiment of the present invention can also be applied to such multi-terminal multilayer ceramic capacitors.

The first external electrode 41 is provided at the corner on the first end surface LS1 side and the first lateral surface WS1 side of the second main surface (bottom surface, mounting surface) TS2 of the multilayer body 10, and on a portion of the first end surface LS1 and the first lateral surface WS1. In the example illustrated in FIG. 11, the first external electrode 41 is also provided at the corner on the first end surface LS1 side and the first lateral surface WS1 side of the first main surface (top surface) TS1 of the multilayer body 10. That is, the first external electrode 41 has an angular U-shape in the LT cross-section and is provided along a portion of the first end surface LS1 side of the second main surface TS2 of the multilayer body 10, the first end surface LS1, and part of the first end surface LS1 side of the first main surface TS1. The first external electrode 41 has an angular U-shape in the WT cross-section and is provided along a portion of the first lateral surface WS1 side of the second main surface TS2 of the multilayer body 10, the first lateral surface WS1, and part of the first lateral surface WS1 side of the first main surface TS1.

The second external electrode 42 is provided at the corner on the second end surface LS2 side and the first lateral surface WS1 side of the second main surface (bottom surface, mounting surface) TS2 of the multilayer body 10, and on a portion of the second end surface LS2 and part of the first lateral surface WS1. In the example illustrated in FIG. 11, the second external electrode 42 is also provided at the corner on the second end surface LS2 side and the first lateral surface WS1 side of the first main surface (top surface) TS1 of the multilayer body 10. That is, the second external electrode 42 has an angular U-shape in the LT cross-section and is provided along a portion of the second end surface LS2 side of the second main surface TS2 of the multilayer body 10, the second end surface LS2, and part of the second end surface LS2 side of the first main surface TS1. The second external electrode 42 has an angular U-shape in the WT cross-section and is provided along a portion of the first lateral surface WS1 side of the second main surface TS2 of the multilayer body 10, the first lateral surface WS1, and part of the first lateral surface WS1 side of the first main surface TS1.

The third external electrode 43 is provided at the corner on the first end surface LS1 side and the second lateral surface WS2 side of the second main surface (bottom surface, mounting surface) TS2 of the multilayer body 10, and on a portion of the first end surface LS1 and part of the second lateral surface WS2. In the example illustrated in FIG. 11, the third external electrode 43 is also provided at the corner on the first end surface LS1 side and the second lateral surface WS2 side of the first main surface (top surface) TS1 of the multilayer body 10. That is, the third external electrode 43 has an angular U-shape in the LT cross-section and is provided along a portion of the first end surface LS1 side of the second main surface TS2 of the multilayer body 10, the first end surface LS1, and part of the first end surface LS1 side of the first main surface TS1. The third external electrode 43 has an angular U-shape in the WT cross-section and is provided along a portion of the second lateral surface WS2 side of the second main surface TS2 of the multilayer body 10, the second lateral surface WS2, and part of the second lateral surface WS2 side of the first main surface TS1.

The fourth external electrode 44 is provided at the corner on the second end surface LS2 side and the second lateral surface WS2 side of the second main surface (bottom surface, mounting surface) TS2 of the multilayer body 10, and on a portion of the second end surface LS2 and part of the second lateral surface WS2. In the example illustrated in FIG. 11, the fourth external electrode 44 is also provided at the corner on the second end surface LS2 side and the second lateral surface WS2 side of the first main surface (top surface) TS1 of the multilayer body 10. That is, the fourth external electrode 44 has an angular U-shape in the LT cross-section and is provided along a portion of the second end surface LS2 side of the second main surface TS2 of the multilayer body 10, the second end surface LS2, and part of the second end surface LS2 side of the first main surface TS1. The fourth external electrode 44 has an angular U-shape in the WT cross-section and is provided along a portion of the second lateral surface WS2 side of the second main surface TS2 of the multilayer body 10, the second lateral surface WS2, and part of the second lateral surface WS2 side of the first main surface TS1.

In the multilayer ceramic capacitor 1 illustrated in FIG. 11, similar to the multilayer ceramic capacitor 1 illustrated in FIGS. 7 to 9, the flat spacer body 55 may be provided in the portions of the first main surface TS1 and the second main surface TS2 where the plurality of external electrodes 40 are not provided. In this case, the stress relief film 50 may further extend to cover the spacer body 55 on the first main surface TS1.

FIG. 11 illustrates the external electrodes 40 with an angular U-shape in cross-section. However, the features of various example embodiments of the present invention are not limited to this configuration, and the multilayer ceramic capacitor 1 as illustrated in FIG. 10 can also be applied to a multilayer ceramic capacitor 1 which includes the external electrodes 40 with an L-shaped cross-section, similar to the multilayer ceramic capacitor 1 illustrated in FIGS. 1 to 3. In such a case, the first external electrode 41 is L-shaped or substantially L-shaped in the LT cross-section and provided along a part of the first end surface LS1 side and along the first end surface LS1 of the second main surface TS2 of the multilayer body 10, and is L-shaped or substantially L-shaped in the WT cross-section and provided along a portion of the first lateral surface WS1 side and along the first lateral surface WS1 of the second main surface TS2 of the multilayer body 10. The second external electrode 42 is L-shaped or substantially L-shaped in the LT cross-section and provided along a portion of the second end surface LS2 side of the second main surface TS2 of the multilayer body 10 and along the second end surface LS2, and is also L-shaped in the WT cross-section and provided along a portion of the first lateral surface WS1 side of the second main surface TS2 of the multilayer body 10 and along the first lateral surface WS1. The third external electrode 43 is L-shaped or substantially L-shaped in the LT cross-section and provided along a portion of the first end surface LS1 side of the second main surface TS2 of the multilayer body 10 and along the first end surface LS1, and is also L-shaped in the WT cross-section and provided along a portion of the second lateral surface WS2 side of the second main surface TS2 of the multilayer body 10 and along the second lateral surface WS2. The fourth external electrode 44 is L-shaped or substantially L-shaped in the LT cross-section and provided along a portion of the second end surface LS2 side of the second main surface TS2 of the multilayer body 10 and along the second end surface LS2, and is also L-shaped in the WT cross-section and provided along a portion of the second lateral surface WS2 side of the second main surface TS2 of the multilayer body 10 and along the second lateral surface WS2.

With regard to the multilayer ceramic capacitor 1 as illustrated in FIG. 11, the features of various example embodiments of the present invention can also be applied to a multilayer ceramic capacitor 1 which includes the external electrodes 40 only on the second main surface TS2, similar to the multilayer ceramic capacitor 1 illustrated in FIGS. 4 to 6.

Modification Example 5

Figure 12:
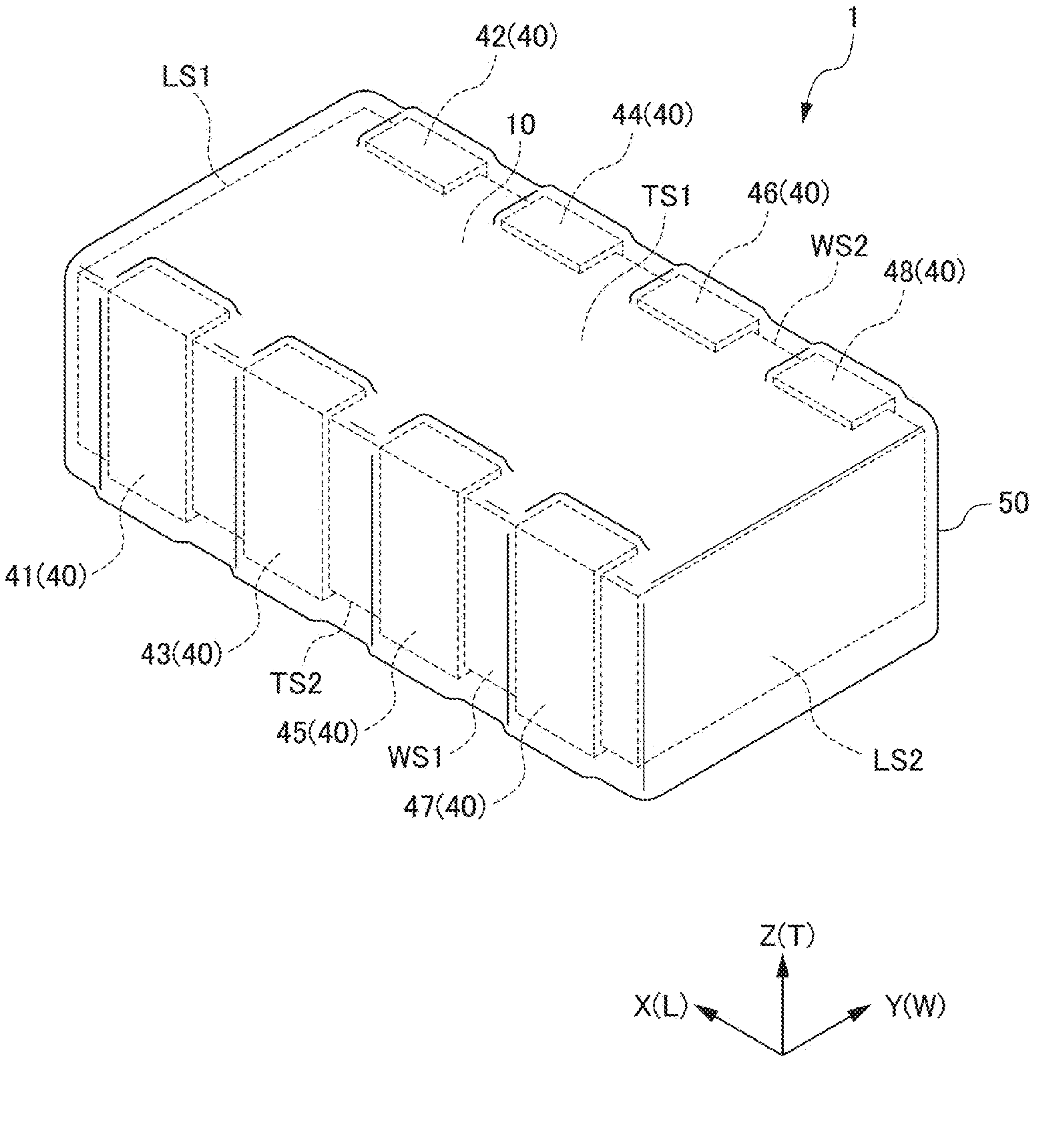
FIG. 12 is a perspective view of a multilayer ceramic capacitor according to another modification example of an example embodiment of the present invention.

FIG. 12 is a perspective view illustrating a multilayer ceramic capacitor according to another modification example of an example embodiment. The number and arrangement of the external electrodes 40 differ between the multilayer ceramic capacitor 1 illustrated in FIG. 12 and the multilayer ceramic capacitor 1 illustrated in FIGS. 7 to 9.

For example, the external electrodes 40 include the first external electrode 41, the third external electrode 43, the fifth external electrode 45, and the seventh external electrode 47 on the first lateral surface WS1 side of the multilayer body 10, and include the second external electrode 42, the fourth external electrode 44, the sixth external electrode 46, and the eighth external electrode 48 on the second lateral surface WS2 side of the multilayer body 10. Such a multilayer ceramic capacitor 1 can include, for example, four multilayer ceramic capacitor elements arrayed between the first external electrode 41 and the second external electrode 42, between the third external electrode 43 and the fourth external electrode 44, between the fifth external electrode 45 and the sixth external electrode 46, and between the seventh external electrode 47 and the eighth external electrode 48. The features of various example embodiments of the present invention can be applied to such array multilayer ceramic capacitors.

Each of the first external electrode 41, the third external electrode 43, the fifth external electrode 45, and the seventh external electrode 47 is provided on a portion of the first lateral surface WS1 side of the second main surface (bottom surface, mounting surface) TS2 of the multilayer body 10 and on the first lateral surface WS1. In the example illustrated in FIG. 12, each of the first external electrode 41, the third external electrode 43, the fifth external electrode 45, and the seventh external electrode 47 is also provided on a portion of the first lateral surface WS1 side of the first main surface (top surface) TS1 of the multilayer body 10. That is, each of the first external electrode 41, the third external electrode 43, the fifth external electrode 45, and the seventh external electrode 47 has an angular U-shape in the WT cross-section and provided along a portion of the first lateral surface WS1 side of the second main surface TS2 of the multilayer body 10, the first lateral surface WS1, and part of the first lateral surface WS1 side of the first main surface TS1.

The second external electrode 42, the fourth external electrode 44, the sixth external electrode 46, and the eighth external electrode 48 are provided on a portion of the second lateral surface WS2 side of the second main surface (bottom surface, mounting surface) TS2 of the multilayer body 10 and on the second lateral surface WS2. In the example illustrated in FIG. 12, the second external electrode 42, the fourth external electrode 44, the sixth external electrode 46, and the eighth external electrode 48 are also provided on a portion of the second lateral surface WS2 side of the first main surface (top surface) TS1 of the multilayer body 10. That is, the second external electrode 42, the fourth external electrode 44, the sixth external electrode 46, and the eighth external electrode 48 have an angular U-shape in the WT cross-section and provided along a portion of the second lateral surface WS2 side of the second main surface TS2 of the multilayer body 10, the second lateral surface WS2, and part of the second lateral surface WS2 side of the first main surface TS1.

With regard to the multilayer ceramic capacitor 1 illustrated in FIG. 12 as well, the flat spacer body 55 may be provided in the portion of the first main surface TS1 and the second main surface TS2 where the plurality of external electrodes 40 are not provided, similar to the multilayer ceramic capacitor 1 illustrated in FIGS. 7 to 9. In this case, the stress relief film 50 may further extend to cover the spacer body 55 on the first main surface TS1.

FIG. 12 illustrates the external electrodes 40 with an angular U-shape in cross-section. However, the features of various example embodiments of the present invention are not limited to this shape, and the multilayer ceramic capacitor 1 as illustrated in FIG. 12 can also be applied to a multilayer ceramic capacitor 1 which includes the external electrodes 40 with an L-shaped cross-section, similar to the multilayer ceramic capacitor 1 illustrated in FIGS. 1 to 3. In this case, each of the first external electrode 41, the third external electrode 43, the fifth external electrode 45, and the seventh external electrode 47 is L-shaped or substantially L-shaped in the WT cross-section and provided along a portion of the first lateral surface WS1 side of the second main surface TS2 of the multilayer body 10 and along the first lateral surface WS1. The second external electrode 42, the fourth external electrode 44, the sixth external electrode 46, and the eighth external electrode 48 are L-shaped in the WT cross-section and provided along a portion of the second lateral surface WS2 side of the second main surface TS2 of the multilayer body 10 and along the second lateral surface WS2.

With regard to the multilayer ceramic capacitor 1 as illustrated in FIG. 12, the features of various example embodiments of the present invention can also be applied to a multilayer ceramic capacitor 1 which includes the external electrodes 40 only on the second main surface TS2, similar to the multilayer ceramic capacitor 1 illustrated in FIGS. 4 to 6.

In the modification examples 1 to 5 described above, the stress relief film 50 has been described as extending along five surfaces: the first main surface (top surface) TS1, the two end surfaces LS1, TS2, and the two lateral surfaces WS1, WS2. However, the present invention is not limited to these examples, and the stress relief film 50 may extend along three surfaces: the first main surface (top surface) TS1 and the two end surfaces LS1, LS2. Alternatively, the stress relief film 50 may extend along three surfaces: the first main surface (top surface) TS1 and the two lateral surfaces WS1, WS2.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:

a multilayer body including a plurality of dielectric layers including a ceramic material, and a plurality of internal electrode layers, the multilayer body including a first main surface and a second main surface on opposite sides in a lamination direction, two lateral surfaces on opposite sides in a width direction intersecting with the lamination direction, and two end surfaces on opposite sides in a length direction intersecting with both the lamination direction and the width direction;

a plurality of external electrodes provided on at least the second main surface of the multilayer body; and a stress relief film to mitigate stress provided on the multilayer body and the plurality of external electrodes; wherein the stress relief film includes an insulating material;

the stress relief film extends along the first main surface and the two end surfaces or extends along the first main surface and the two lateral surfaces, so as to cover the multilayer body and the plurality of external electrodes;

an end portion of the stress relief film protrudes beyond an outermost surface of the plurality of external electrodes, on the second main surface side; and a portion of the second main surface is exposed from each of the plurality of external electrodes and the stress relief film.

2. The multilayer ceramic capacitor according to claim 1, wherein the stress relief film extends along the first main surface and the two end surfaces, and also extends along the first main surface and the two lateral surfaces.

3. The multilayer ceramic capacitor according to claim 1, wherein a strength of the stress relief film is greater than a strength of the plurality of dielectric layers of the multilayer body.

4. The multilayer ceramic capacitor according to claim 1, wherein a Young's modulus of the stress relief film is between about 400 GPa and about 1500 GPa inclusive.

5. The multilayer ceramic capacitor according to claim 1, wherein the stress relief film includes diamond-like carbon or glass.

6. The multilayer ceramic capacitor according to claim 1, wherein the stress relief film includes a first portion with a thickness Da along the first main surface, and a second portion with a thickness Db along either of the two end surfaces or the two lateral surfaces, satisfying a relationship:

about 0.8 $Da \geq Db$.

7. The multilayer ceramic capacitor according to claim 6, wherein the thickness Da of the first portion is between about 4.5 μm and about 5.5 μm inclusive.

8. The multilayer ceramic capacitor according to claim 1, wherein each of the plurality of external electrodes is L-shaped or substantially L-shaped in cross-section along the lamination direction and the length direction, and is provided along the second main surface and one of the two end surfaces; or each of the plurality of external electrodes is L-shaped or substantially L-shaped in cross-section along the lamination direction and the width direction, and is provided along the second main surface and one of the two lateral surfaces.

9. The multilayer ceramic capacitor according to claim 1, wherein each of the plurality of external electrodes is provided only along the second main surface of the multilayer body; and the multilayer body extends in the lamination direction and includes a plurality of vias that connect the plurality of external electrode layers to different portions of the plurality of internal electrode layers.

10. The multilayer ceramic capacitor according to claim 1, wherein each of the plurality of external electrodes:

is U-shaped or substantially U-shaped in cross-section along the lamination direction and the length direction, and is provided along the second main surface, one of the two end surfaces, and the first main surface of the multilayer body; or is U-shaped or substantially U-shaped in cross-section along the lamination direction and the width direction, and is provided along the second main surface, one of the two lateral surfaces, and the first main surface of the multilayer body;

a flat spacer body is provided in a portion of the first and second main surfaces where the plurality of external electrodes are not provided; and the stress relief film extends further to cover the spacer body on the first main surface.

11. The multilayer ceramic capacitor according to claim 1, wherein the end portion of the stress relief film protrudes beyond the outermost surface of the plurality of external electrodes by about 5 μm and about 10 μm inclusive.

12. The multilayer ceramic capacitor according to claim 1, wherein the stress relief film is positioned to prevent short circuits between the plurality of external electrodes.

13. The multilayer ceramic capacitor according to claim 1, wherein the plurality of external electrodes are not provided on a side of the first main surface or the second main surface.

14. The multilayer ceramic capacitor according to claim 1, wherein the plurality of external electrodes are not provided on a side of the two lateral surfaces.

15. The multilayer ceramic capacitor according to claim 1, wherein the stress relief film is located on five surfaces of the multilayer body.

16. The multilayer ceramic capacitor according to claim 1, wherein the stress relief film is located on only three surfaces of the multilayer body.

17. The multilayer ceramic capacitor according to claim 1, wherein the stress relief film is located on the first main surface, the two end surfaces, and the two lateral surfaces.

18. The multilayer ceramic capacitor according to claim 1, wherein the stress relief film is located on the first main surface and the two end surfaces.

19. The multilayer ceramic capacitor according to claim 1, wherein the stress relief film is located on the first main surface and the two lateral surfaces.

* * * * *